(12) United States Patent
Rutenberg et al.

(10) Patent No.: US 11,449,973 B2
(45) Date of Patent: *Sep. 20, 2022

(54) ENHANCED EXTENDED DEPTH OF FOCUSING ON BIOLOGICAL SAMPLES

(71) Applicant: CDx Medical IP, Inc., Suffern, NY (US)

(72) Inventors: Mark Rutenberg, Monsey, NY (US); Richard Scott, Chestnut Ridge, NY (US); Robert Tjon, Nyack, NY (US); Paul Seltzer, Monsey, NY (US)

(73) Assignee: CDx Medical IP, Inc., Suffern, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/591,294

(22) Filed: Feb. 2, 2022

(65) Prior Publication Data

US 2022/0156906 A1 May 19, 2022

Related U.S. Application Data

(63) Continuation of application No. 17/264,006, filed as application No. PCT/US2019/044639 on Aug. 1, 2019, now Pat. No. 11,263,735.

(60) Provisional application No. 62/713,076, filed on Aug. 1, 2018.

(51) Int. Cl.
*H04N 5/232* (2006.01)
*G06T 5/50* (2006.01)
(Continued)

(52) U.S. Cl.
CPC .............. *G06T 5/50* (2013.01); *G02B 21/367* (2013.01); *G06T 5/003* (2013.01);
(Continued)

(58) Field of Classification Search
CPC ................ G02B 21/361; G02B 21/367; G06K 9/00134; G06T 2207/10056;
(Continued)

(56) References Cited

U.S. PATENT DOCUMENTS

| 2004/0076315 A1 | 4/2004 | Scoll et al. |
| 2005/0036702 A1* | 2/2005 | Yang .................. G02B 27/0075 382/284 |

(Continued)

OTHER PUBLICATIONS

Extended EP Search Report dated Mar. 25, 2022 from European Patent Application No. 19844886.2.
(Continued)

*Primary Examiner* — James T Boylan
(74) *Attorney, Agent, or Firm* — Amster, Rothstein & Ebenstein LLP

(57) ABSTRACT

A system and method for constructing a digital composite image of a three-dimensional biological sample. The system includes an optical system that captures images of cells and tissue presented on a specimen slide. The system systematically acquires a stack of images at different segments across the specimen slide. For each segment, the system dynamically calculates an optimal focal plane. Once an optimal focal plane is determined for each of the stacks of images, the system generates a composite image by copying the sharpest objects from each of the optimal focal planes.

9 Claims, 11 Drawing Sheets

(51) Int. Cl.
*G02B 21/36* (2006.01)
*G06T 5/00* (2006.01)

(52) U.S. Cl.
CPC . *H04N 5/232125* (2018.08); *H04N 5/232127* (2018.08); *G06T 2207/10056* (2013.01); *G06T 2207/20221* (2013.01); *G06T 2207/30024* (2013.01)

(58) Field of Classification Search
CPC . G06T 2207/20221; G06T 2207/30024; G06T 5/003; G06T 5/50; H04N 5/232125; H04N 5/232127
See application file for complete search history.

(56) References Cited

U.S. PATENT DOCUMENTS

| | | | |
|---|---|---|---|
| 2009/0046909 A1* | 2/2009 | Rutenberg | G06T 5/50 382/128 |
| 2011/0157344 A1 | 6/2011 | Xie et al. | |
| 2017/0111581 A1* | 4/2017 | Muenzenmayer | G06T 3/4053 |
| 2017/0350805 A1* | 12/2017 | Murata | G01N 15/1475 |
| 2018/0156713 A1 | 6/2018 | Berezhna et al. | |
| 2018/0172589 A1 | 6/2018 | Gouda et al. | |
| 2021/0045632 A1* | 2/2021 | Pentico | A61B 3/117 |
| 2021/0073979 A1* | 3/2021 | Masutani | G02B 21/365 |
| 2021/0149170 A1* | 5/2021 | Leshem | G02B 21/006 |

OTHER PUBLICATIONS

Heechul Han et al., "Virtual Out of Focus With Single Image to Enhance 3D Perception," 3DTV Conference: The True Vision—Capture, Transmission and Display of 3D Video (3DTV-CON), 2011, IEEE, May 16, 2011, pp. 1-4.

Shain et al., "Extended Depth-of-Field Microscopy With A High-Speed Deformable Mirror,"Adaptive Optics and Wavefront Control for Biological Systems III, edited by Thomas G. Bifano et al., Progress in Biomedical Optics and Imaging, SPIE—International Society for Optical Engineering, Bellingham, WA, U.S., vol. 10073, Feb. 21, 2017, pp. 100730E-1 to 100730E-7.

International Search Report and Written Opinion dated Oct. 29, 2019 from PCT International Appln No. PCT/US2019/044639.

* cited by examiner

ENHANCED EXTENDED DEPTH OF FOCUSING ON BIOLOGICAL SAMPLES

CROSS-REFERENCE TO RELATED APPLICATIONS

This application is a continuation of U.S. patent application Ser. No. 17/264,006, filed Jan. 28, 2021, which is a U.S. national stage entry under 35 U.S.C. § 371 of PCT International Patent Application No. PCT/US2019/044639, filed Aug. 1, 2019, which claims priority to U.S. Provisional Patent Application No. 62/713,076, filed Aug. 1, 2018, the contents of each of which are hereby incorporated by reference in their entirety.

FIELD OF THE INVENTION

The present invention generally relates to the field of medical diagnostics. More particularly, the present invention pertains to improved systems and methods for processing digital microscope images to facilitate detection of cancerous and pre-cancerous tissue and cells.

BACKGROUND OF THE INVENTION

Pathologists typically utilize high-resolution microscopes to examine tissue samples, for example, to identify signs of cancer or pre-cancerous cells. In order to make an accurate and correct diagnosis, the pathologist must see cellular and tissue features in focus under a high-resolution microscope. However, high-resolutions microscopes used by pathologists have limitations which make it difficult to analyze thick biological specimens that have objects of interest on different planes.

Specifically, a microscope's lens can only be focused at single point, and there is a finite distance in front of and behind this focal point that may be considered sharp. This finite distance is known as the depth of field. As is well known, high-resolution microscopes, such as those used by pathologists, have a limited or narrow depth of field. As a result, objects that appear outside of a given depth of field or focal plane of the microscope are blurred and out of focus, forcing the pathologist to manually and continually alter the focus when viewing a thick sample. This limits the productivity of the pathologist and also increases the likelihood he or she will miss a subtle feature that may appear only in a narrow focal plane.

This limitation is particularly acute in the analysis of thick tissue specimens (e.g., those that are thicker than the depth of field of a microscope objective) or uneven tissue specimens, since the entire specimen cannot be imaged in a single focal plane. The three-dimensional character of such specimens requires constant refocusing to observe cells at various contours of the sample. As a result, the pathologist does not see the whole sample in focus, limiting the pathologist's ability to recognize subtle diagnostic features that expand over several focal planes.

For example, when obtaining a non-lacerational brush biopsy of a tissue, a brush is used that is sufficiently stiff so as to penetrate tissue. In the process of obtaining a full thickness tissue specimen, tissue fragments in addition to single cells and cell clusters are obtained and transferred onto a microscope slide. The collection of such thick specimens is described, for example, in U.S. Pat. No. 6,258,044.

Such specimens contain single cells, cell clusters and tissue fragments, and are essentially a hybrid between a cytological smear and histological sections. Such specimens may be, for example, 20 to 60 microns thick. However, the depth of field of a typical 20× microscope with a 0.75 NA (Numerical Aperture) may be just 4 microns. Thus, such specimens cannot be readily imaged and, as a result, conventional microscopy does not present all of the information that a pathologist needs when making a diagnosis (e.g., an image that is entirely in focus).

The ability to view tissue fragments, in addition to single cells, would confer an advantage to a pathologist in making a diagnosis. For example, intact tissue provides the pathologist with important information about a tissue's architecture that is not available in cytological smears. This benefit is especially critical in the evaluation of gastrointestinal tissue, which is a complex tissue containing various cell types including, for example, glandular, squamous and columnar epithelium.

One solution to the above problem is provided in U.S. Pat. No. 8,199,997 ("the '997 patent"). That patent discloses systems and methods that compose a two-dimensional image out of a thick, three-dimensional, specimen. This allows a pathologist to capture the information available from a three-dimensional specimen without the drawbacks associated with a conventional microscope. The systems and methods disclosed in the '997 patent utilize extended depth of focus ("EDF") processing techniques. As described therein, with EDF processing, an automated microscope captures a set of image slices taken at regular intervals along the z-axis (at the same location) and then recovers from each slice those pixels that are in focus to build a single composite image from the in focus pixels.

Although the invention of the '997 patent represents a significant improvement over conventional microscopy techniques, further improvements in EDF-based imaging systems are needed for imaging thick, semi-transparent biological specimens. In this regard, conventional EDF systems and methods bring all image elements into sharpness, regardless of their location in a set of images. These systems and methods may do this by iteratively traversing a collection of images and identifying the sharpest portions of each image. A composite image is then formed using only the pixels located in the sharpest portions of each image in the image set. This conventional process works well with non-transparent or opaque objects, where it is not possible to see any objects below the surface. However, in semi-transparent images objects, such as tissue samples, objects below the surface are visible to the microscope, which introduces additional complexity.

Specifically, conventional EDF systems and methods would bring objects on the surface and those underneath the surface into focus, making it appear that both the upper and lower objects are on the same focal plane and causing objects to appear closer to each other than they really are. Such undesirable image artifacts can cause cells to look crowded and therefore unhealthy, which could significantly change the diagnosis of the area rendered by the pathologist and/or computer system, e.g., from benign to dysplastic (i.e., pre-cancerous). In this regard, healthy tissue will appear to have regular spacing between the cells, whereas in cancerous tissue the spacing between cells is highly irregular, or cells are not uniformly aligned with one another. Conventional EDF also has a natural tendency of decimating the z-relationship between objects to enhance focus, whereas it would be desirable to preserve the spacing between nuclei, and thereby the true diagnosis.

Accordingly, systems and methods are needed that create a composite image from a collection of images while preserving the spatial relationship between objects on different planes. Further, systems and methods are needed that identify the optimal focal plane for a collection of images.

Another problem with conventional EDF systems is that the magnification changes as the microscope's objective is moved up and down between focal planes. In particular, when the objective is moved, new objects will appear in focus, while other objects will becomes less focused. At the same time, those less focused objects also become smaller due to magnification changes. As a result, the edges in the image move as the focus changes and the image correspondingly shrinks, potentially causing the algorithm to recognize each moving edge as a separate edge at each focal plane. This may result in the system splitting a single edge into a "stair-case" of multiple adjacent edges in the composite EDF image. In such circumstances, the "moving" false edges may overwhelm the image itself and introduce staircase artifacts on the composite EDF images. These artifacts may, for example, appear as white flakes on the composite image.

In EDF systems, it is often advantageous to obtain a stack of images along a z-axis with large steps between images (e.g., for increased speed in the imaging process). This step size may be close to the depth of field of the system. Therefore, systems and methods are needed that preserve object edges, yet allow large steps between images.

Furthermore, systems and methods are needed that take advantage of the valuable diagnostic information uniquely contained in a brush biopsy sample. By way of example, a large number of patients in the United States and across the globe undergo endoscopy procedures, whereby a doctor observes sections of the upper gastrointestinal tract, the bile duct or other areas of the body using an endoscope. In such procedures, a doctor may perform forceps biopsies and/or brush biopsies to retrieve tissue samples for laboratory analysis.

During a forceps biopsy procedure, small sections of tissue are excised from focused areas of the esophagus at given intervals. In a laboratory, the excised tissue segments are sliced with a microtome into flat sheets for analysis by a pathologist. As such, a pathologist reviewing these conventional tissue specimens analyzes substantially flat tissue sections where minimal refocusing is necessary.

During a brush biopsy procedure, on the other hand, a brush biopsy instrument having stiff bristles is used to sweep a wide area of tissue and obtain a full thickness sample of tissue of the wide tissue area. The biopsy brush removes small tissue segments that are transferred to a specimen slide substantially intact. Since these tissue segments are not sliced (as described above with respect to forceps biopsies), the natural architecture of the tissue is maintained. Significantly, this preserves the en face view of the tissue for observation by a pathologist and/or analysis by a computer system (unlike conventional histologic tissue preparations where the en face view is destroyed due to tissue slicing).

The en face view of the tissue confers valuable diagnostic information. For example, cells of the gastrointestinal tract are organized in a lattice structure that forms a "honeycomb." This hexagonal tissue architecture is typical of glandular cells in the body, such as bile duct, colon, breast, etc., and of transitional regions where squamous and glandular tissues meet such as esophageal or endocervical cells.

In healthy tissue, evenly-spaced nuclei can be observed forming the honeycomb appearance. However, in early dysplasia, individual nuclei may become slightly enlarged and the normal nuclear cytoplasmic ratio increases. When this occurs, neighboring nuclei grow closer to one another and begin crowding together. In addition, instead of packing into an organized honeycomb, the nuclei become disorganized and the relationships of cells to each other become haphazard in nature. Thus, the presence or absence of a honeycomb structure and the degree of crowding and disorganization are important diagnostic features in detecting early stage disease and discerning between dysplastic and benign conditions.

Although brush biopsies are able to obtain tissue fragments that retain the en face view of the tissue and retain the honeycomb for clinical observation, constituent cells that form the honeycomb are often located in different focal planes, and as such, a pathologist is unable to observe the honeycomb in-focus. Rather, the pathologist is required to view one or more cells at a first focal distance in isolation, then view one or more cells at a second focal distance in isolation, and so on. Not only is this manual process tedious, it is also unreliable. In this regard, the pathologist must remember the relationship and distance between the cells at the different focal distances and then mentally piece together all of the information that he or she has observed. By way of analogy, rather than viewing a picture of a forest, the pathologist is forced to look at individual trees and try to construct in his/her mind an image of the forest.

Known EDF techniques have not resulted in the honeycomb being properly imaged, as they fail to preserve the spatial relationship between cells in thick, semi-transparent samples. As a result, the honeycomb is not clearly imaged and its regularity and potential abnormality is harder to evaluate. In conventional EDF systems, all the nuclei will appear on the same plane, thereby making the honeycomb appear more crowded, giving the pathologist the false impression that the cells are becoming dysplastic.

Accordingly, improved systems and methods are needed that can create an in-focus view of the honeycomb structure for analysis by a computer and/or a pathologist.

SUMMARY OF THE INVENTION

It is an object of the present invention to provide an EDF system that generates an in-focus composite image of a biological sample whereby diagnostically important image objects are presented in focus and underlying objects are de-emphasized.

It is another object of the invention to determine a plurality of optimal focal planes for different segments of the biological sample and obtain image objects from the plurality of the optimal focal planes to generate a digital composite image.

It is yet another objection of the invention to determine whether a distance between cells in a tissue are within a predetermined healthy distance, and when such determination is made, to de-emphasize image objects underlying a plane occupied by the cells within the predetermined healthy distance.

It is another object of the invention to generate an en face image of a tissue where constituent cells comprising the tissue are located on different planes.

BRIEF DESCRIPTION OF THE DRAWINGS

The features and advantages of the present disclosure will be more fully understood with reference to the following, detailed description when taken in conjunction with the accompanying figures, wherein.

DETAILED DESCRIPTION OF THE INVENTION

Embodiments of the present invention will now be described with reference to the above-identified figures of the Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

As discussed above, conventional EDF systems typically blindly extract the sharpest pixels from each focal plane when generating a composite image. Thus, when such algorithms are applied to thick, semi-transparent biological specimens, they do not necessarily take into account which specific pixels belong to which specific objects, and thus, are sometimes unable to preserve the spatial arrangement of such objects. For instance, where multiple objects or cells are situated in different planes (but overlay one another), a composite image generated by conventional EDF systems may appear to represent a single cell, when in fact there were several cells stacked on top of each other. This is because the spatial relationship between the objects in different planes is not always preserved when conventional EDF is used. This issue can significantly change the diagnosis of the area rendered by the pathologist and/or computer system, e.g., from benign to dysplastic (i.e., pre-cancerous).

Figure 1:
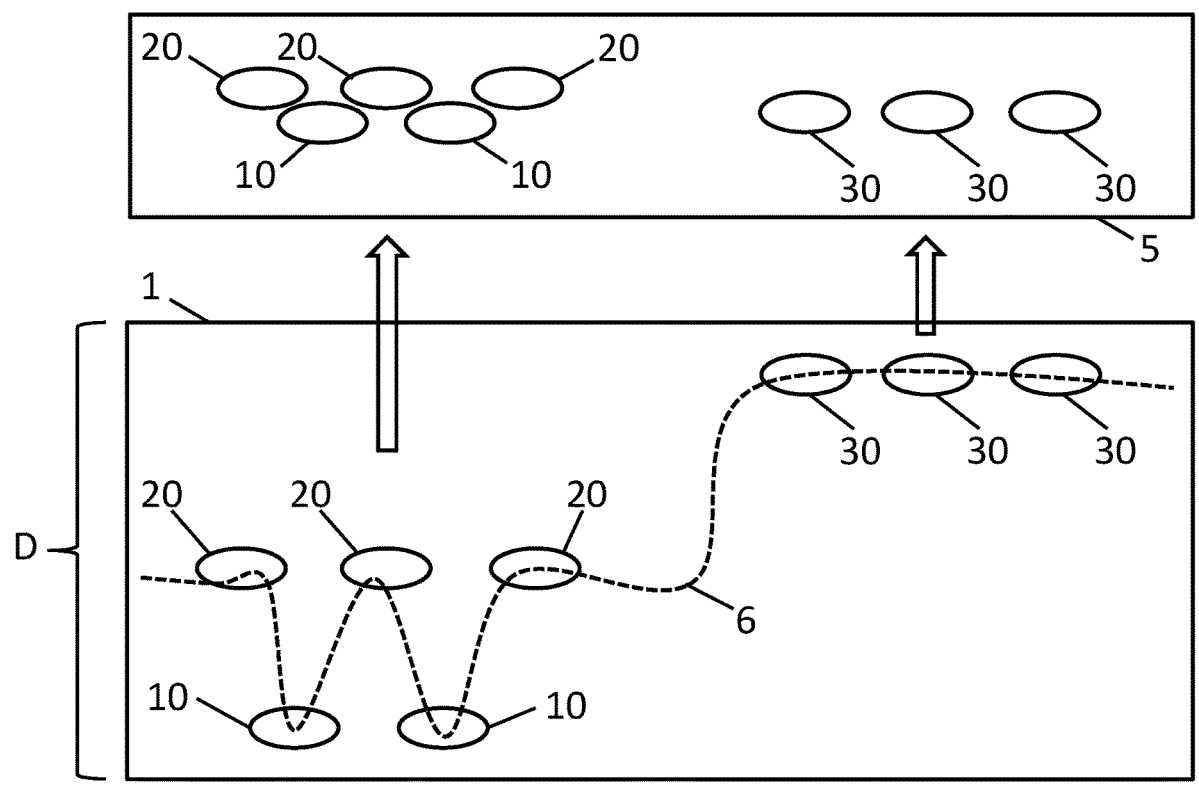
FIG. 1 is a schematic cross-sectional view of a representative tissue sample that has been imaged using a conventional EDF system.

FIG. 1 demonstrates the operation of conventional EDF systems. Specimen 1 is a semi-transparent tissue sample having a depth D and contains objects of interest (e.g., cells) 10, 20 and 30. Objects 30 are located on a first focal plane (closest to the top of the specimen), objects 20 are located on a second, lower focal plane, and objects 10 are located on a third focal plane that is below the second focal plane. Objects 20 located in the second focal plane overlap with objects 10 located on the third focal plane. The output of a standard EDF system is shown in composite image 5. As can be seen, conventional EDF systems blindly extract the pixels corresponding to the sharpest objects in each focal plane when generating the composite image. Conventional EDF plane 6 does not take into account or preserve the spatial relationship of the various objects in the specimen 1. As a result, objects 10 and 20 appear crowded together in composite image 5, even though they are, in fact, located on different planes. These objects may incorrectly appear as a single cell or mass in the composite image 5, which could result in an incorrect diagnosis by a pathologist or a computer system. In this regard, the pathologist may interpret the composite image 5 as dysplastic, when it merely includes healthy cells located on different planes. Therefore, it would be desirable if an EDF system could provide a composite EDF image with objects 20 and 30 in focus, but objects 10 out of focus.

Figure 2:
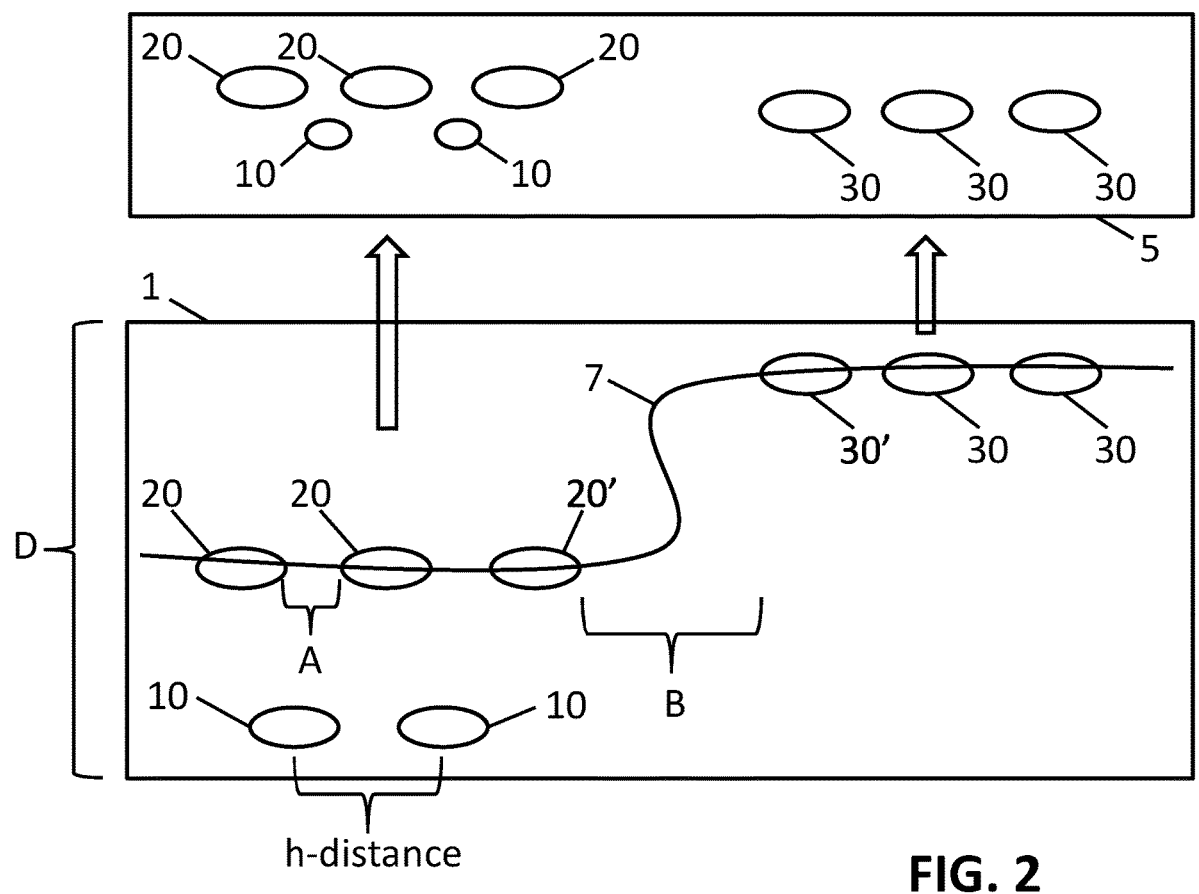
FIG. 2 is a schematic cross-sectional view of a representative tissue sample that has been imaged using an embodiment of the enhanced EDF system of the present invention.

The operation of the enhanced EDF system of the present invention is demonstrated with reference to FIG. 2, which shows the same schematic specimen as in FIG. 1. Specifically, specimen 1 is a semi-transparent tissue sample having a depth D and contains objects of interest (e.g., cells) 10, 20 and 30. Objects 30 are located on a first focal plane (closest to the top of the specimen), objects 20 are located on a second focal plane (beneath objects 30), and objects 10 are located on a third focal plane (beneath objects 20). Objects 20 overlap objects 10. However, rather than blindly copy the pixels corresponding to the sharpest objects in each focal plane to the composite image 5, the enhanced EDF system identifies optimal focal plane 7 in specimen 1. As a result, when composite image 5 is generated, objects 10 are deemphasized and the spatial representation of objects 10 with respect to objects 20 is preserved.

Sample Collection and Preparation:

Although applicable to many fields, it has been found that the systems and methods of the present invention are useful in the analysis of tissue samples collected using a brush biopsy instrument, for other smear preparations, and for traditional histological samples imaged at 40X with a high-NA objective. As discussed above, when obtaining a brush biopsy of a tissue, a brush is used that is sufficiently stiff so as to penetrate the various layers of tissue (e.g., epithelial tissue). In the process of obtaining a full thickness tissue specimen, tissue fragments in addition to single cells and cell clusters are collected.

Typically, in the preparation of a cellular specimen for pathology, a clinician will transfer and affix cells and/or tissue to a glass microscope slide. The slide is then sent to a laboratory for further processing and medical diagnosis. Further processing may include staining the slide to enhance the contrast of the sample (or specific features of a sample) when viewed under a microscope. Such stains may include, for example, Feulgen, Papanicolaou, hematoxylin and eosin (H&E), alcian blue, and IHC stains. A laboratory technician may also apply a cover slip and a label to the slide. Among other things, the label may identify the type of stain applied to the sample. This information may be represented in a bar code or embedded in an electronic tracking device (e.g., RFID). As discussed further below, in later processing steps, a computer system can read this information to determine the optimum processing algorithm to apply to a particular sample.

In the present invention, however, a slide may undergo additional processing prior to being examined by either a pathologist and/or a computer system. Specifically, captured digital microscope images of the cellular specimen are further processed by the enhanced EDF system described herein, which produces an enhanced digital image that preserves diagnostically important objects and their spatial relationships to one another. This increases the accuracy of the computer analysis system as artifacts and false images are reduced and the diagnostically important objects of interest are presented to the computer in focus.

Figure 3:
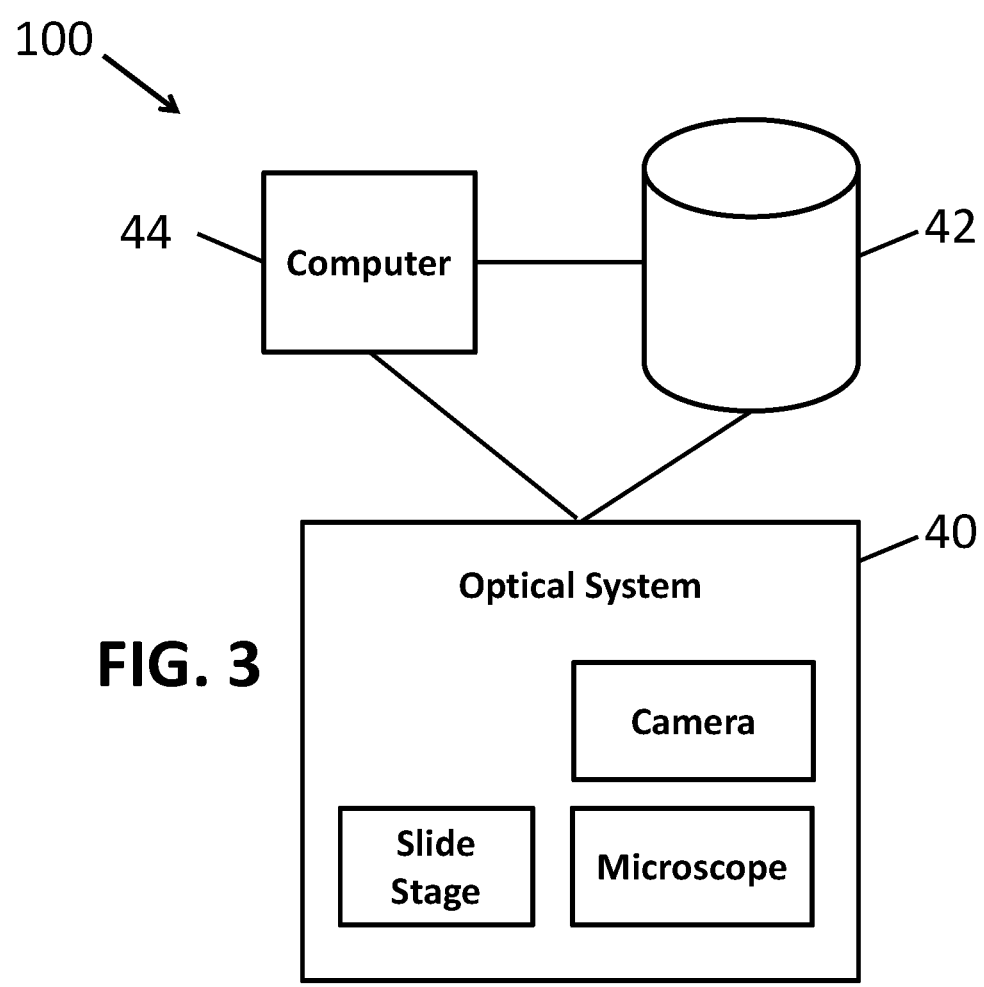
FIG. 3 is a block diagram of the enhanced EDF system according to an embodiment of the present invention.

A block diagram of the enhanced EDF system 100 of the present invention is shown in FIG. 3. The system 100 comprises an optical system 40 for obtaining a collection of images from a slide. The optical system 40 may include a high powered microscope, a slide positioning stage and a camera. A computer apparatus 44 controls the movement of the stage in the z-direction to obtain a sufficient number of images slices to compose an image of a particular x-y position. The system 100 further comprises a storage device 42 for storing the collection of images. Storage device 42 may comprise a hard drive or SSD (solid state drives) or other type of high speed memory device. The computer apparatus 44 (or multiple computers working together) processes the collection of z-stack images in order to generate the enhanced composite image discussed herein. The computer apparatus 44 may utilize specialized image processing hardware (such as a graphical processing unit or "GPU") for increased processing speed.

It will be understood by those of ordinary skill in the art that the optical system 40 may be configured to capture and store an image after every move of the stage, or it can alternatively be configured to capture images consecutively and continuously at regular time intervals while the stage moves at a constant speed. In embodiments of the invention, the latter method may be faster at creating z-stacks. However, care must be taken to add sufficient light into the system (e.g., via a stroboscope) so that the image capture integration time can be kept to a minimum. In other embodiments of the invention, the system is configured to perform either a lossy or non-lossy compression on the z-stack images and move the compressed version of the z-stack images offline (e.g. over ethernet) for more intensive EDF calculations. This is done so the image z-stack capture process can occur at max speed (constrained by mechanical movements), where the EDF processing can be performed, in parallel, by multiple computers. This decoupling allows max throughput with maximum scalability at minimal cost. All mechanical movements are isolated to the scanner/image part, whereas the second part is highly scalable by adding additional computers as necessary to work on the individual z-stacks in a round-robin fashion.

Figure 4:
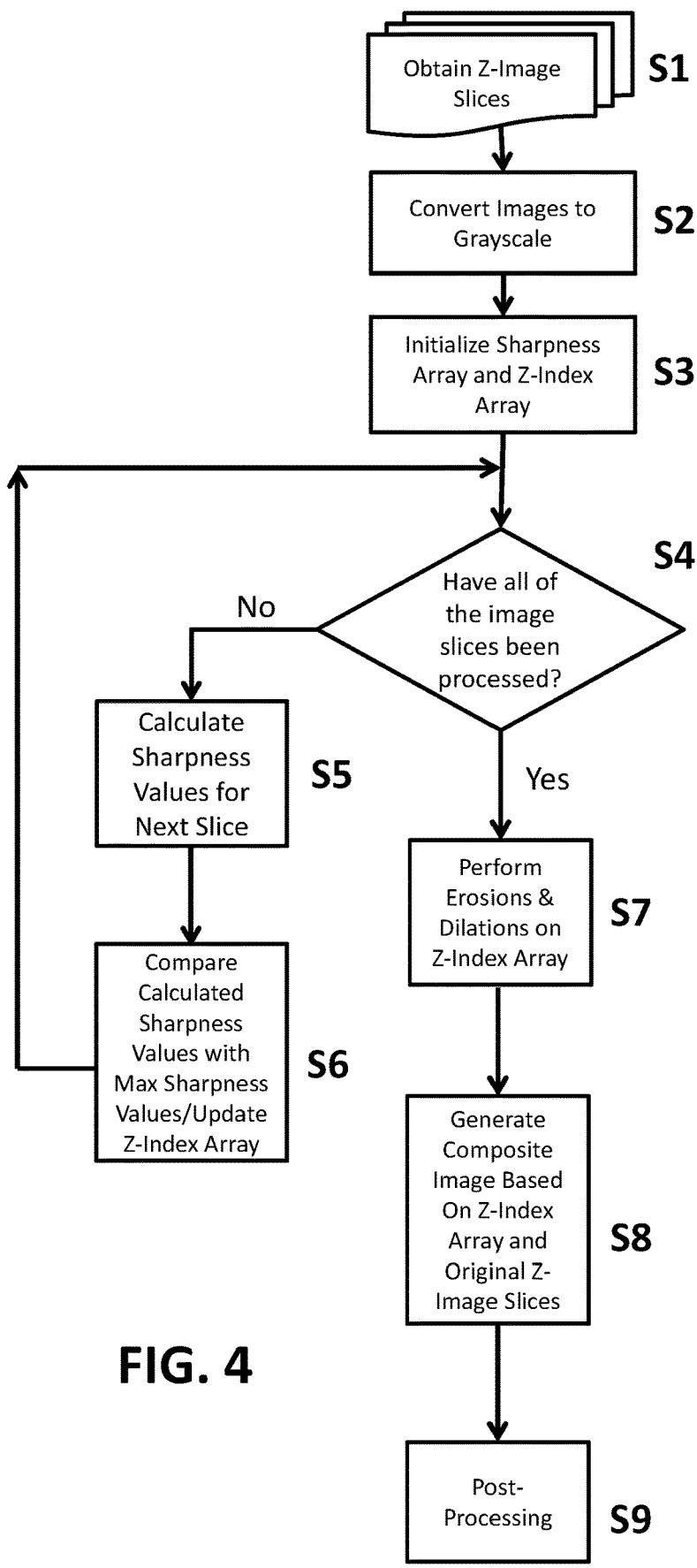
FIG. 4 is a flow chart of an embodiment of the enhanced EDF processing method according to an embodiment of the present invention.

One embodiment of processing steps performed by an enhanced EDF system is shown in the flowchart of FIG. 4.

Image Collection:

As shown in Step S1 of FIG. 4, an optical system obtains a collection of images slices, each taken at different focal depths (or focal planes) along a z-axis (i.e., the microscope axis). The collection of images are preferably stored in memory of the computer where the CPU has direct access to the computer memory to do the intensive EDF operations, or in another embodiment the z-stack images can be stored in a separate processing or grabber board that has a separate CPU, RISC, GPU or FPGA processor that is capable of doing fast EDF operations. Once EDF is complete, the collection of images are stored in a data storage device (FIG. 3, 42) for retrieval by the computer apparatus. The number of images in the stack may depend on a number of factors, including the thickness of the sample under examination, and the depth of field of the microscope objective. Generally, it is preferred to use an interval less than the depth of field of the microscope objective to meet the criteria of oversampling. This ensures consistent sharpness throughout the full thickness of the specimen. For example, assuming that a sample is 60 um thick and an image is taken at 4 um focal depth intervals, a total of 15 or more images (or slices) may be collected.

The sampling interval can be pre-determined, e.g., based upon pre-established data. Alternatively, the sampling interval can be determined dynamically by the computer system, e.g., by measuring the number of sharp pixels on each focal plane and adapting the processing when relatively few sharp pixels are found. The algorithm may be adapted by terminating the z-scan prematurely or extending the z-scan if additional sharp pixels are still to be found, or by increasing the z-distance between focal planes if minimal sharp pixels are found. The fewer steps that can be taken the faster the system can present the final EDF image, but this has to be balanced with the image quality loss that can occur if the steps are too large.

Pre-Processing:

In one embodiment, the images in the stack are converted to grayscale, as shown in Step S2 of FIG. 4. It has been found that by converting each image to grayscale, the amount of image data and associated processing is significantly reduced without sacrificing diagnostic accuracy. In this regard, grayscale conversion may be optimized for specific immunostains, e.g., for H&E or Alcian blue. For instance, color deconvolution can be used to enhance immunostained cells and ensure that particular colors remain in focus. In one embodiment, the system automatically reads information relating to the applied stains from the slides to determine the optimum processing algorithm to apply to a particular sample.

In another embodiment, rather than convert the collected images to grayscale, the enhanced EDF system performs the EDF processing directly on the color images. For example, edge contrast can be calculated directly from the three RGB color images as the maximum of the red, green and blue contrast.

In Step S3, the various data structures that will be required for image processing may be initialized. These may include a number of two-dimensional arrays, including the Max Sharpness Array and Z-Index Array, which will be discussed further below. Alternative data structures known to those of skill in the art, such as collections, tables or data objects, may be used in place of pixel arrays.

Locating the Sharpest Objects in the Image Collection:

With reference to Steps S4, S5 and S6 of FIG. 4, the enhanced EDF system iteratively traverses the collection of images taken from different focal distances along a z-axis in order to identify the location of the sharpest objects in the collection of images. Specifically, beginning at the top (or bottom) of the image stack, the system initializes by calculating the sharpness of the objects on the first image plane. The calculated sharpness values are stored in the Max Sharpness Array and the Z-Index Array is populated with the index of the starting image plane (e.g., Plane 1, representing the topmost plane). For all subsequent planes along the z axis, the system calculates the sharpness for each pixel or object in that plane and compares the sharpness of the objects in the new image plane with those stored in the Max Sharpness Array. If a new maximum sharpness value is located, the system stores: (1) the new maximum sharpness value in the Max Sharpness Array (in place of the old Max value) and (2) its location (i.e., the index of the image slice in which it is located) in the Z-Index Array.

Determining Optimal Focal Plane:

The enhanced EDF system next calculates the optimal focal plane for the sample under review (Step S7). As discussed above, this step ensures that the spatial relationship between objects of interest within the sample is maintained. As a result of obtaining the optimal focal plane and creating a composite image using the derived optimal focal plane, overlying objects are presented in focus and underlying objects are maintained out of focus.

In an embodiment of the invention, the optimal focal plane is determined by calculating the distance between cells and determining whether or not the cells are within a normal or healthy distance from one another (referred to as the "h-distance," FIG. 2). In embodiments of the invention, the healthy distance, or "h-distance" is a predetermined distance between cellular edges or between two nuclei. For example, in one embodiment of the invention, the h-distance is calculated by measuring a distance between the edges of nuclei of neighboring cells, in another embodiment the h-distance is calculated by measuring the distance between the centers of neighboring nuclei.

In the event that two cells are determined to be within the h-distance, the system concludes that the two cells are of the same tissue and, as such, the plane occupied by the neighboring cells will be the focal plane, and underlying cells will remain out of focus. If, however, the distance between two cells is greater than the h-distance, the system will shift the focal plane to allow both, unrelated cells to be maintained in focus.

For example, referring to FIG. 2, the system determined that the distance between objects 20 (e.g. distance A) are within the h-distance. Thus, the plane occupied by objects 20 is selected as the optimal focal plane for that slide segment and objects 20 are presented in focus. Underlying objects 10, on the other hand, remain out of focus. Conversely, distance B between object 20' and object 30' is determined to be greater than the h-distance. As a result, the focal plane shifts (rightward in the orientation shown) to the slide segment where objects 30 are positioned within the h-distance from one another. The h-distance may be measured by linear metric units or by numbers of pixels, according to embodiments of the invention.

In one embodiment of the invention, the focal plane is determined by performing a "closing" on the Z-Index Array. A closing is set of operations where a predefined number of grayscale dilations is followed by an equal number of grayscale erosions. For example, assuming an h-distance of five pixels, the system utilizes a structuring element of five pixels, or it performs multiple iterations to cover the h-distance. Thus, the dilations will completely cover the h-distance gap. Once the gap is filled and pixels on either side of the gap become fused, any subsequent erosions will not have any effect. If, however, the gap is not filled, the subsequent erosions will restore the edges to their original positions. Thus, the closing can fill the gap completely, (i.e. yield the same z-index) and, thus not bring an underlying image (e.g. a cell nucleus) to the surface if such image exists between the gap. If, however, the closing does not fill the gap, and there is one or more nuclei underneath between the gap, it will bring the nuclei to the stop of the surface. It will be understood that erosions and dilations may be performed by any of various techniques known in the art, e.g., the Gil-Kimmel dilation/erosion algorithm (See Gil, J. Y., & Kimmel, R, Efficient dilation, erosion, opening, and closing algorithms. *IEEE Transactions on Pattern Analysis and Machine Intelligence,* 24(12), 1606-1617 (2002)).

Thus, in the exemplary embodiment shown in FIG. 2, distance B between cell 20' and 30' is greater than the h-distance. As such, although the dilations will extend the image of cell 20' in all directions and also extend the image of cell 30' in all directions, the gap between the respective cells will not be filled in. As a result, after the erosions are performed, the original edges of cells 20' and 30' will be restored and the plane occupied by cells 20 will not fuse with the plane occupied by cells 30. Instead, the focal plane effectively shifts from the plane occupied by cells 20 to the plane occupied by cells 30. Conversely, because the distance between cells 20 are within the h-distance, the dilations performed on cells 20 will have the effect of filling the gaps between respective cells 20, which will not be reversed by the subsequent erosions. Thus, the plane occupied by cells 20 will be determined as the focal plane and, consequently, cells 20 will be presented in focus, whereas cells 10 bellow the gaps between cells 20 will be presented out of focus. This ensures that the spatial relationship between cells 20 and lower lying cells 10 are preserved.

In one embodiment, a flat 5×5 approximately circular kernel is used for the erosions and dilations. In another embodiment, a grayscale gaussian kernel is used, such as that taught in the Gil-Kimmel reference cited above. The number of erosions and dilations are selected to present overlying objects in focus and maintain underlying objects out of focus. Because the determination of an optimal focal plane is made in response to distances between objects, the optimal focal plane may vary as the system moves across the distance of a specimen, concentrating more on the upper nuclei layer where the nuclei are most visible and has the sharpest features (light is less diffracted near the surface of the semi-transparent medium) but still capable of bringing deeper nuclei to the surface.

Figure 5:
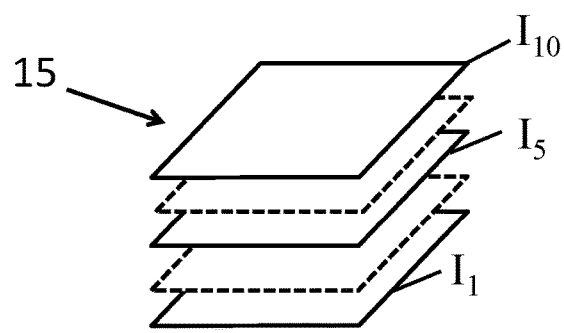
FIG. 5 is a diagram that shows elements of representative images captured using the enhanced EDF system according to an embodiment of the present invention.
Figure 5:
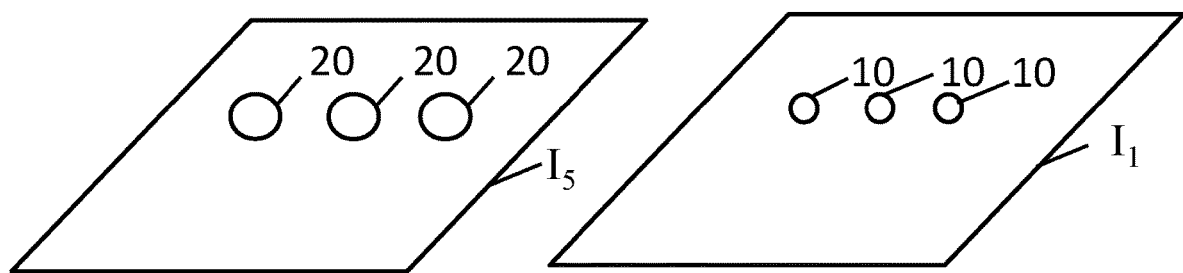
Figure 6:
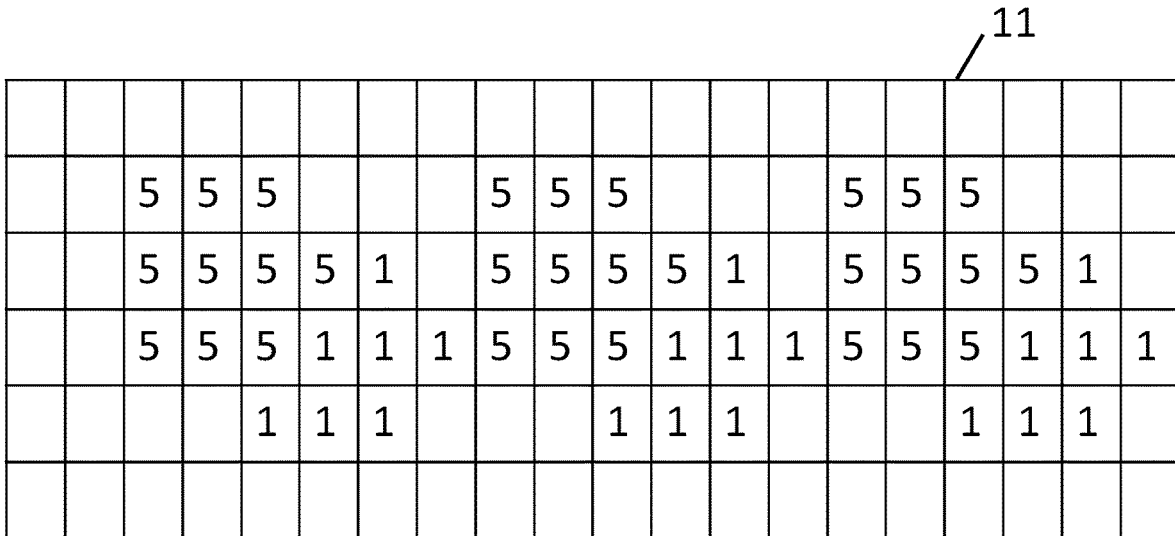
FIG. 6 is a chart depicting one step of the method performed by the enhanced EDF system according to an embodiment of the present invention.

The result of the dilation/erosion procedure discussed above is further illustrated in FIGS. 5 and 6. In FIG. 5, a stack of images 15 is shown, with image $I_{10}$ positioned on the top of the image stack. Images $I_5$ and $I_1$ include various objects that are in focus in each of these image planes. Objects 20 overlap objects 10 in the z-axis. A portion of a representative Z-Index Array 11 generated from image stack 15 is shown in FIG. 6. As can be seen, the Z-Index Array contains the location (i.e., the image plane number) of the pixels corresponding to the sharpest objects in the image stack 15 (FIG. 5). Specifically, the location of objects 20 are denoted by a "5" and the location of objects 10 are denoted by a "1". If the final composite image were to be compiled from Z-Index Array 11 in FIG. 6 (i.e., as in conventional EDF), objects 10 and 20 would appear as a single object (i.e., objects 10 would crowd objects 20). As discussed above, this could result is a misdiagnosis. Thus, the spatial relationship in the composite image needs to be preserved in order accurately depict the specimen and to make a correct diagnosis.

Figure 7:
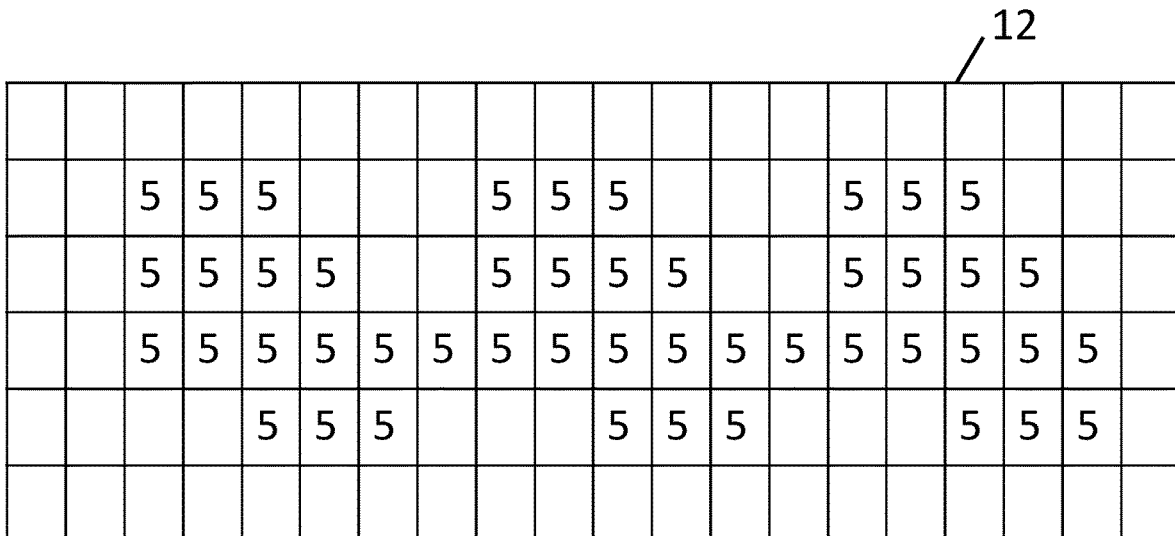
FIG. 7 is a chart depicting another step of the method performed by the enhanced EDF system according to an embodiment of the present invention.

FIG. 7 depicts the representative Z-Index Array of FIG. 6 after a number of dilations and erosions have been performed. Specifically, the objects located on Image have been successfully deemphasized and the spatial relationship of the objects has been maintained. As can be seen, only objects 20, denoted by a "5," remain in the Index 12. Thus, when the final composite image is compiled, the pixels that would have been otherwise retrieved from Image $I_1$ are retrieved from Image $I_5$.

In one embodiment, the number of dilations or erosions is equal to the h-distance between nuclei in healthy tissue. As stated above, the enhanced EDF system will deemphasize or not bring into focus lower objects if the distance between the nuclei of the upper layer is less than h-distance. On the other hand if the distance is larger h-distance, it can be assumed that the two nuclei are not of the same tissue and therefore can bring any lower level objects into focus safely without introducing the crowding effect discussed above. For example the h-distance could be 5 pixels, or 18 microns.

It has been found that this process effectively locates the optimal focal plane for a collection of images and eliminates the undesirable crowding effect. The system described herein may be used to find the optimal focal plane for cellular structures of interest, such as cell nuclei. However, the system can be adapted to focus on other structures of interest, particularly cytoplasmic mucus pockets in goblet cells and/or cell boundaries to enhance detection of honeycomb arrangements of cells.

It has been found that, to find large, bright mucus areas, the system may perform dilations and erosion with larger size kernels, such as those in the range 10×10 to 20×20 (depending on resolution of the image). This process produces a Z-Index Array for large, bright high contrast objects, such as mucin regions found in goblet cells. To find cell boundaries, the algorithm performs a morphological operation to enhance thin dark lines (erosion by a ring structuring element followed by dilation by a solid structuring element of the same size). This produces a Z-Index Array for thin dark lines such as fish-scales at the apical surface of the cell. The three Z-Index arrays may be used to create three separate EDF images, allowing a user to see different cellular structures of interest at different focal planes. Alternatively, the three Z-index arrays may be combined by taking the Z-Index with max sharpness, then smoothing by a 5×5 Gaussian kernel.

Generating Composite Image and Post-Processing:

As shown in Step S8, the system next generates the composite image based upon the Z-index Array (which now contains the location of the optimal pixels to be included in the composite image) and the original collection of images. It should also be understood that multiple image stacks could be obtained for a single slide, separately analyzed (as discussed below), and the resultant composite images stitched together to form a single composite image. Or, a single stack of images may be obtained and sent to multiple algorithms, each algorithm looking for specific features and each algorithm generating a unique composite image. For example, a user can select an optimal composite image for goblets, another composite image for dysplastic cells, and another composite image for honeycomb patterns.

Various post-processing operations (Step S9) may optionally be performed on the composite image. In one embodiment, the post-processing includes a sharpness correction, which makes an object's edges appear more pronounced and aids in diagnosis. In one embodiment, the sharpness correction comprises unsharp masking, which is known to sharpen edges without increasing noise. Generally, unsharp masking uses a blurred negative image (e.g., a Gaussian blur) to create a mask of the original image to identify areas of high and low frequency. The mask is then combined with the original image, creating an image that is sharper than the original image. Further post processing steps include Guided filter, XYZ-dilation, haze removal and Z-interpolation, as discussed below.

Analysis of Honeycomb Structure

As described, brush biopsy tissue collection allows for the collection of tissue fragments that maintain the en face view of the tissue intact. That is, conventional histology samples are sliced and presented as tissue slices to a pathologist, and as such, the pathologist never observes the en face view of the tissue. The en face honeycomb appearance of the tissue yields important clinical information that is uniquely available with brush biopsy collection. Embodiments of the enhanced EDF system allow for the observation and analysis of a tissue's honeycomb structure as a whole, even while the constituent cells forming the honeycomb may occupy several focal planes.

Figure 8A:
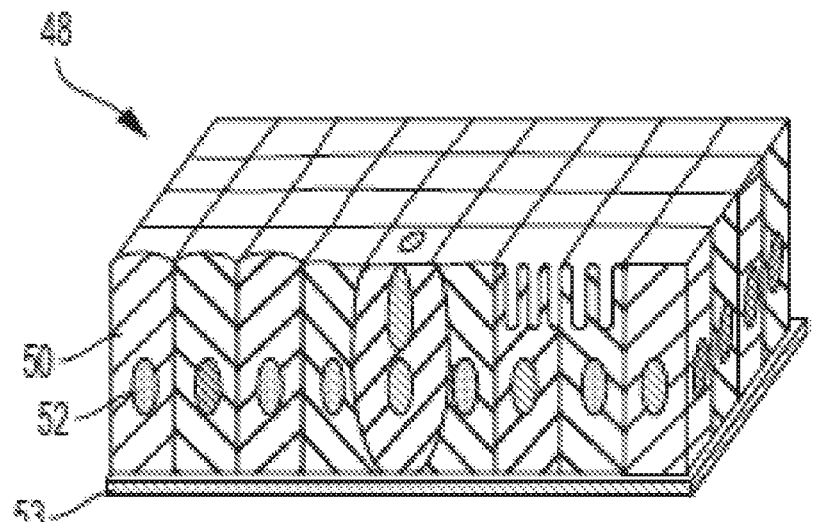
FIG. 8A is a schematic side perspective view of a columnar epithelial tissue section.

FIG. 8A shows a schematic view of a fragment of glandular epithelial tissue 48. As shown, the tissue is formed of columnar cells (e.g. 50) packed together lengthwise. The cells' nuclei 52 are located at a bottom segment of the cells 50. The cells 50 are located on a basement membrane 53. The apical surfaces of the cells form the tissue surface. When viewed under a microscope with the focus at the level of the nuclei, the nuclei appear in a hexagonal pattern. When the focus is on the top, the cell membranes form a hexagonal "fish-scales" pattern. When the focus is between the top surface and the nuclei, clear mucin regions of goblet cells can be seen most clearly. Most of the pathologist's observation is focused at the level of nuclei, though the mucin and fish-scales level views are also utilized to assist a pathologist in diagnosis.

Figure 8B:
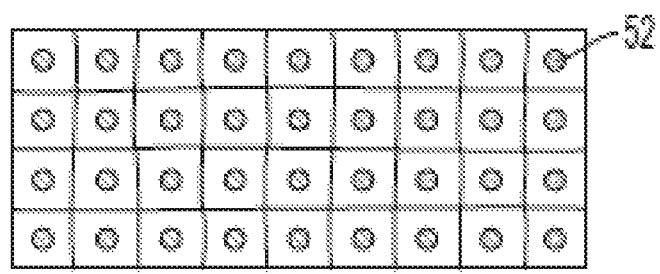
FIG. 8B is a schematic top view of the tissue section of FIG. 8A, showing a honeycomb pattern.

FIG. 8B shows a top view of the tissue fragment of FIG. 8A with the focus level on the cells' nuclei. A regular pattern of cell nuclei (i.e. "the honeycomb") can be observed.

In three-dimensional brush biopsy tissue preparations, however, the cells forming the honeycomb may be located on different focal planes. In this regard, it would be impossible to view the honeycomb in focus without creating a composite image of it.

Figure 9:
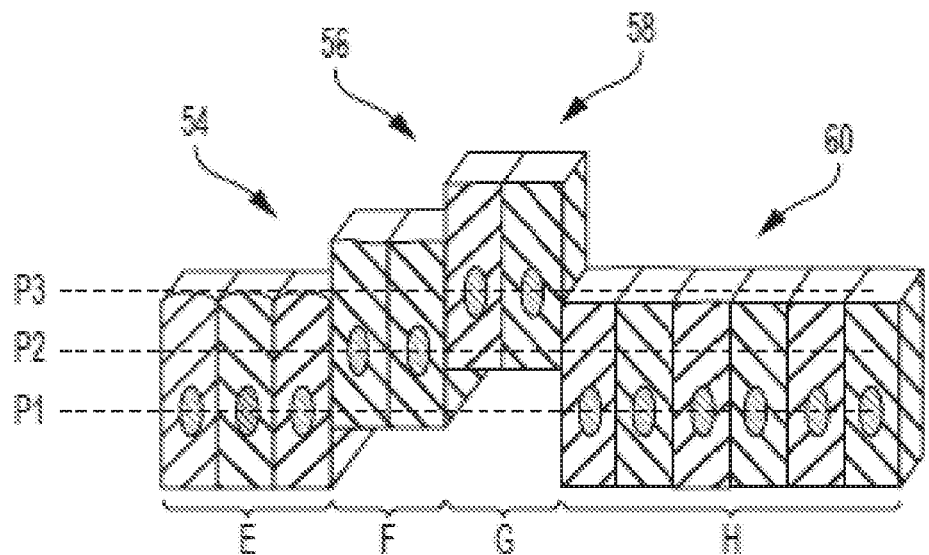
FIG. 9 shows a schematic side view of a columnar epithelial tissue section where constituent cells of the tissue section occupy different planes.

For example, referring to FIG. 9, nuclei cells 54 and 60 are shown at a first focal plane P1, nuclei cells 56 are shown on a different focal plane P2, and nuclei of cells 58 are shown on still a different focal plane P3. When the microscope objective is set to view nuclei cells 58 in focus, then nuclei of cells 54, 60, and 56 will be out of focus. When nuclei of cells 56 are in focus, then nuclei of cells 58 and cells 54 will be out of focus. In this respect, a pathologist utilizing a manual microscope will not be able to view the entire honeycomb pattern in focus. Prior EDF systems do not adequately address this problem because they will non-discriminately bring all cell nuclei to the top surface. As such, lower lying nuclei associated with cells or tissue that may be underlying the honeycomb may be included in the composite image, which may result in an image artifact.

The system of the invention, on the other hand, dynamically shifts the focal plane to capture the best focal plane for each segment of the specimen, and as a result, the honeycomb structure is imaged in focus even if its constituent cells are located on multiple focal planes. Moreover, cells that are not associated with the honeycomb will remain out of focus.

Figure 10:
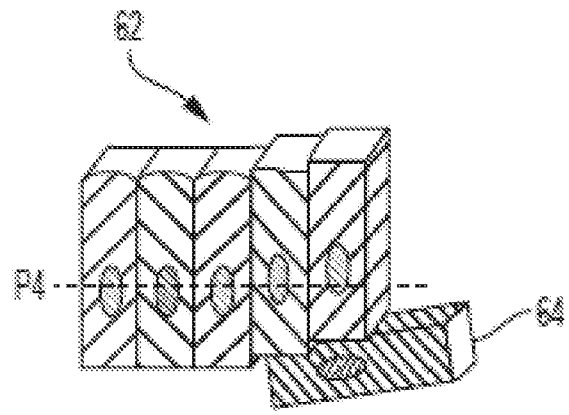
FIG. 10 shows a schematic side view of a columnar epithelial tissue section where a series of cells occupy an upper plane and an underlying cell is occupies a lower plane.

For example, still referring to FIG. 9, the EDF system of the invention will dynamically select P1 as the optimal focal plane for section E of the specimen, select P2 as the optimal focal plane for section F of the specimen, select P3 as the optimal focal plane for section G of the specimen and select P1 as the optimal focal plane for section H of the specimen. In addition, as stated, the EDF system of the invention creates a composite image that deemphasizes features located below the calculated optimal focal plane. Thus, where an optimal focal plane is determined based on the proximity of a series of upper cells, cells that may be directly beneath the upper cells will remain out of focus, thereby preserving the spatial relationship between the upper cells and the lower cells. For example, in FIG. 10 a series of cells 62 are shown with their respective nuclei occupying focal plane P4. A cell 64 is shown underlying cells 62. However, in the embodiment shown, the distance between cells 62 are within the h-distance, and as such focal plane P4 is determined by the system to be the optimal focal plane. As a result, underlying cell 64 will remain out of focus. Significantly, features associated with cell 64 will not be brought to the surface.

A computer analyzing a resultant composite image will be more accurate and sensitive because each of the cells in the honeycomb will be presented in focus and underlying cells will not cause image artifacts. Similarly, rather than analyzing cells and cluster of cells in isolation, the composite image provides a pathologist a gestalt view of the honeycomb. This allows the pathologist to analyze cells and cell clusters in the context of other cells and cell clusters.

Figure 11:
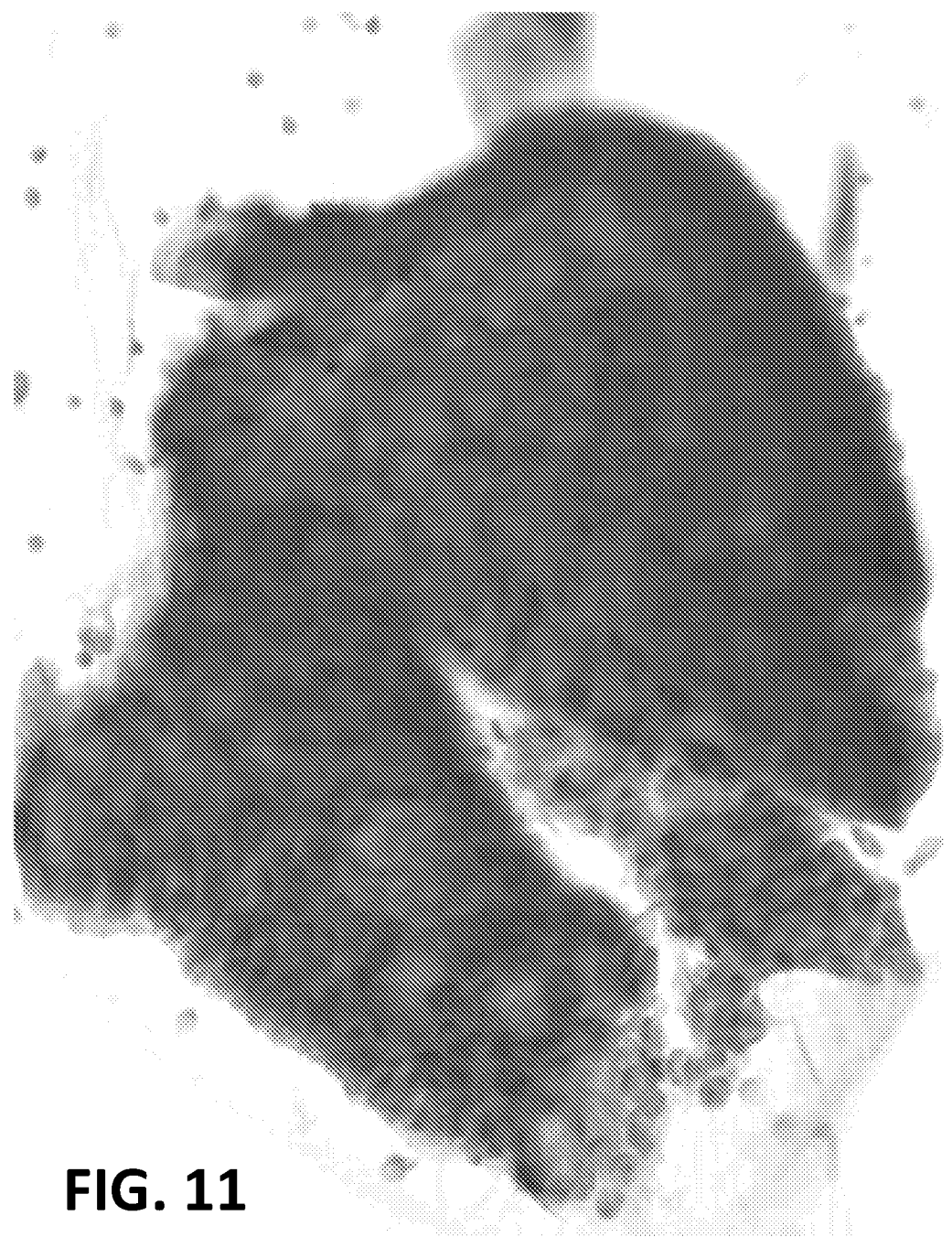
FIG. 11 shows a composite image of a tissue specimen obtained without the enhanced EDF system in accordance with embodiments of the invention.

FIG. 11 is a composite image of a tissue specimen obtained without the enhanced EDF system. As can be seen, large portions of the image are blurred and out of focus. Notably, the honeycomb structure as a whole cannot be observed.

Figure 12:
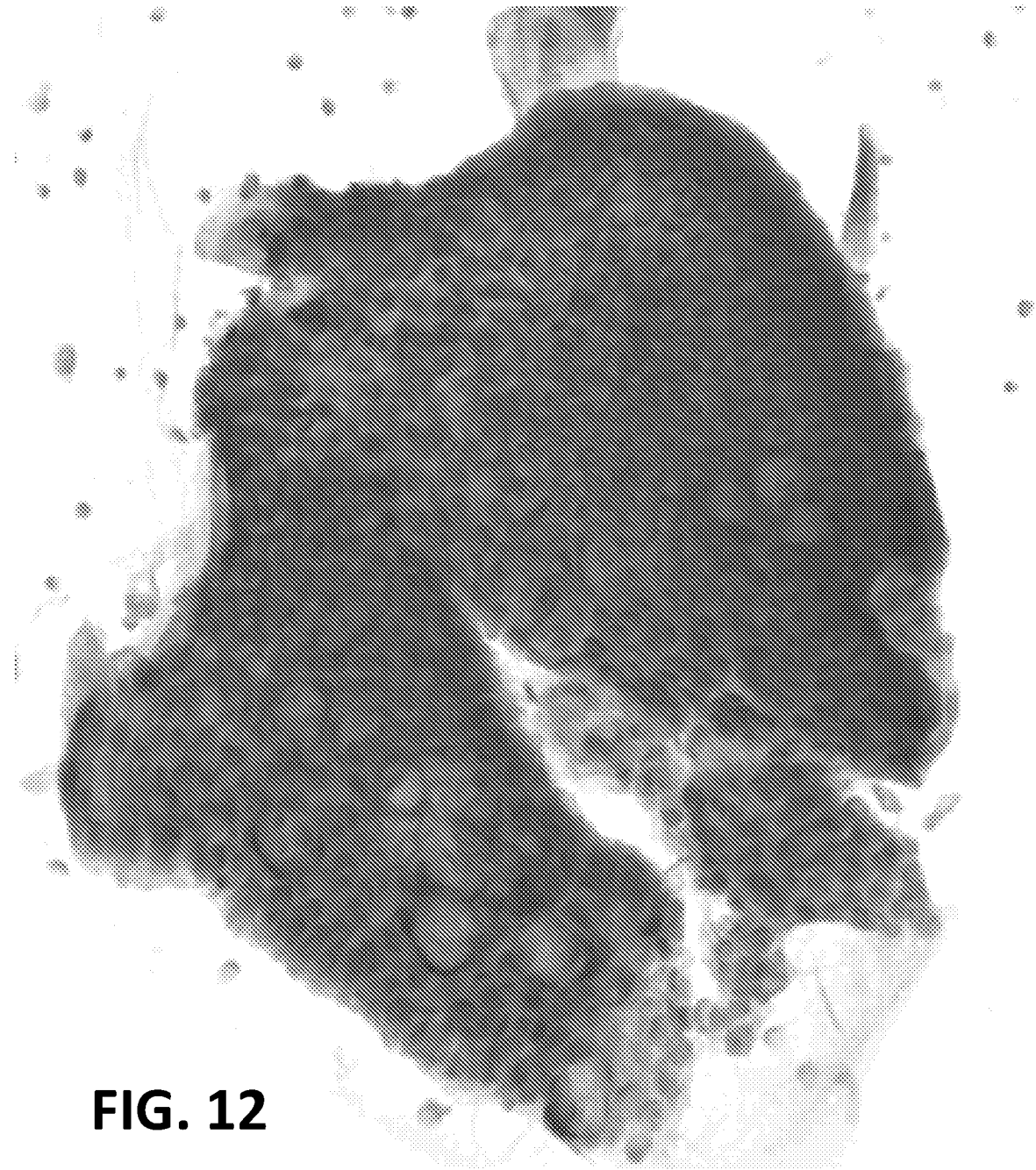
FIG. 12 shows a composite image of tissue specimen obtained using the enhanced EDF system according to an embodiment of the present invention.

FIG. 12 is a composite image of tissue specimen obtained using the enhanced EDF system of the present invention. In this image, the honeycomb structure is in focus. As such, the honeycomb can be more readily observed and analyzed by a pathologist.

Significantly, since the enhanced EDF system images the entire honeycomb, a computer system can perform morphological analysis to identify abnormalities in the sample. For example, it has been found that cell nuclei can be distinguished from cytoplasm. Once the nuclei have been isolated, the distance between the nuclei (the h-distance) can be measured. The computer system can then assess whether the honeycomb is normal or abnormal, for example by calculating the mean and standard deviation h-distances to a nucleus' nearest neighbors, and then calculating the proportion of nuclei with h-distances outside of the range found in regular hexagonal non-dysplastic tissue. Additionally the hexagonal arrangement can be visualized and evaluated with the focal plane at the level of the cell-boundaries instead of at the level of nuclei, where the image takes on a regular hexagonal "fish-scales" appearance, without distinct nuclei, as shown in FIG. 11.

Guided Filter

It is advantageous to preserve the edges of tissues and cellular structures present in the specimen. However, standard averaging or other non-discriminatory smoothing techniques are incapable of distinguishing edges. Thus, in embodiments of the invention a novel guided filter is utilized to perform accurate edge-preserving smoothing without shifting the xy location of the steep contours in the Z-index Array, which are especially acute with thick specimens. With any objective that uses a magnification lens, the magnification changes as you move away from the focal plane. On each z-movement, the object being imaged shrinks, causing false edges to move accordingly. Using a guided filter, emphasis is placed where the true edge is, thereby nullifying the effect of the false edge. The guided filter may be applied on greyscale or color images. The novel usage of the guided filter in this application smooths the Z-index Array, which contains the z-location of the sharpest pixels. This dynamically removes z-index noise and is preferred over other smoothing techniques.

XYZ-Dilation Algorithm

One potential undesired effect of obtaining multiple images from various focal distances is the emergence of artifact edges that may arise with each focal point. That is, with the acquisition of each EDF image slice, out-of-focus pixels adjacent to the true edge may present as a "false" edge. When a succession of such artifact edges are generated, they may take on the appearance of a staircase (i.e., a staircase effect). For example, FIG. 13 ("BEFORE" image) shows a series of artifact edges 66 forming a staircase-like presentation on a composite image. This may distort the sample and obscure useful, diagnostically important, tissue or cellular features.

In embodiments of the invention, this straircasing issue is addressed by a z-index post-processing algorithm that is designed to eliminate the staircase artifact edges caused by selection of out-of-focus pixels when performing the EDF algorithm steps as described. This is achieved by suppressing multiple adjacent edges and preserving only the strongest edge. In an embodiment of the invention this is achieved by performing dilation with "carry-along" of z-values. To this end, the system is configured to determine an edge and run a routine or algorithm that places the edge strength in the top 8-bits of a 16-bit image, and the z-index of the best focus in the bottom 8-bits. During dilation (e.g., 12×12 dilation), the z-values in the bottom 8-bits are carried along with the corresponding edge contrast in the top 8-bits, as a side-effect of the dilation algorithm. As a result, the adjacent weaker edges with erroneous z-indices are replaced by the stronger edges with better z-indices. The best focus z-index image is then updated using the bottom 8-bits from the dilated image.

Figure 13:
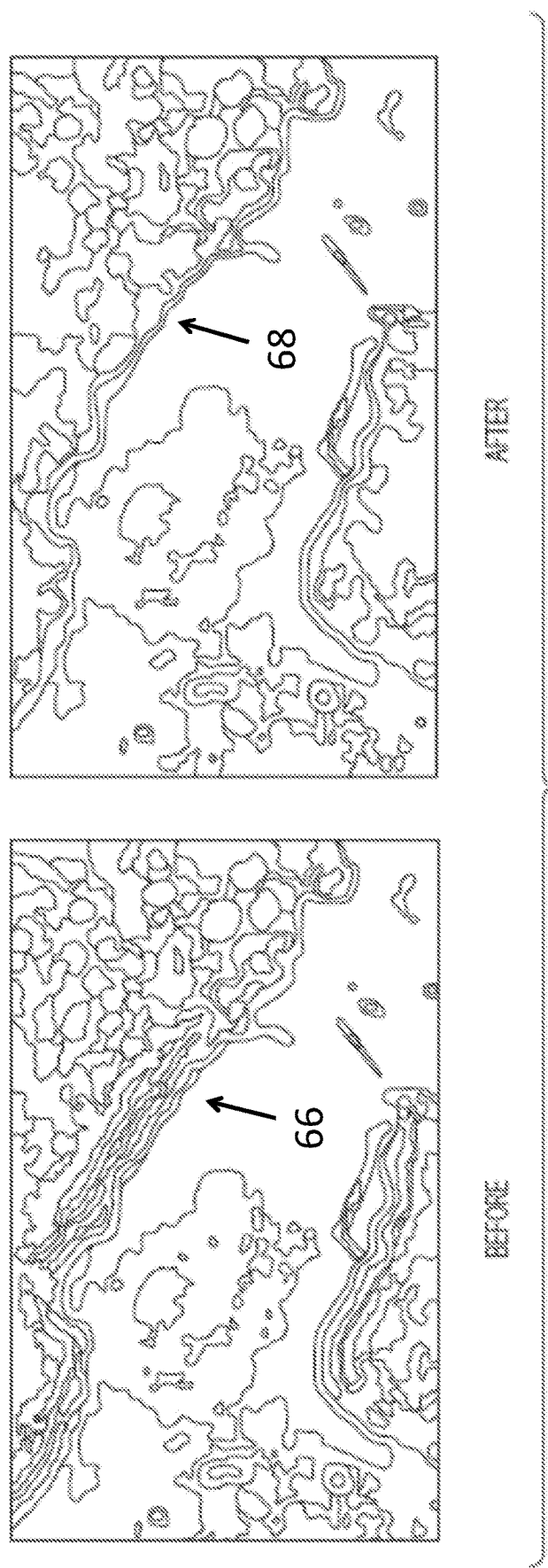
FIG. 13 shows schematic comparative representations of a specimen area with a "staircasing artifact" and of the same specimen area where the artifact is eliminated according to an embodiment of the present invention.

Thus, FIG. 13 ("BEFORE" image) shows a composite image that was processed with an EDF system that did not include the "carry along" feature as described. As shown, a series of false edges 66 are present at the tissue edge. In the "AFTER" image, on the other hand, the same specimen is shown having been post-processed using the "carry-along" algorithm as described. As shown, the staircase artifacts have been eliminated and a sharp true edge 68 is present.

Haze Removal

Microscope images typically include haze caused by non-focused, scattered light. Haze removal can be performed by estimating the image haze, and subtracting the haze from the original images to produce clearer images in which diagnostic information is more readily visible. In one embodiment, the system estimates haze by eroding an R,G,B image with a flat 5×5 approximately circular kernel, taking the minimum value of the erosion, performing guided image filtering to smooth the haze and clipping the haze contrast removed to a maximum value of 32 grey levels (on a scale of 256).

Z-Interpolation

In the described EDF system, there may be a large jump in Z-index values from one focus level to the next, when in reality, the focus level changes smoothly. Such discrepancy may result image artifacts. To address this problem, the EDF system may be configured to perform a post-processing Z-interpolation routine to eliminate such artifacts. In this embodiment, the system determines the size of the microscope focus step, which can be as large as the depth of field of the microscope, e.g., up to 4 microns for a 20× objective lens. The Z-interpolation algorithm stretches the Z-index array to increase the contrast before guided filtering of the Z-index array is performed. This produces smoothed z-indices. The algorithm then interpolates the image intensity using the two best neighboring focus levels, thereby achieving a smooth image.

As discussed above, in both telecentric and non-telecentric EDF systems, a single edge may appear as multiple edges in the composite EDF image. It has been found that this problem can be addressed by one or more of the above processing steps. In alternative embodiments, the ordering of the steps may be altered, for example by applying XYZ-dilation before guided filtering.

While this invention has been described in conjunction with the embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for generating a composite digital image of a biological sample comprising:
   a computer apparatus configured to generate a composite image of the biological sample from a plurality of images of the biological sample, each of the plurality of images taken along a single axis, wherein the computer:
   (a) identifies a first focal plane, wherein the first focal plane comprises a first z distance, for a first collection of image objects at a first x-y location of the biological sample, and
   (b) identifies a second focal plane, wherein the second focal plane comprises a second z distance, for a second collection of image objects at a second x-y location of the biological sample, and
   (c) identifies a first optimal focal plane and a second optimal focal plane based on (a) and (b) respectively, and
   (d) combines image objects from a first optimal focal plane and image objects from a second optimal focal plane and generates the composite digital image,
   wherein the computer apparatus calculates a sharpness value for the image objects in the first focal plane and calculates a sharpness value for the image objects in the second focal plane and generates a two-dimensional map of the location of the objects having the highest sharpness values, and
   wherein the computer apparatus identifies an optimal first focal plane and optimal second focal plane for the first and second collection of image objects by performing one or more dilations and erosions on the two-dimensional map of the location of the image objects having highest sharpness values in the first and second focal planes wherein the number of erosions and dilations is proportional to the distance between cell objects of interest in healthy tissue, so as to thereby identify a first and a second optimal focal plane, and wherein image objects located on the first optimal focal plane are presented in-focus and image objects below the first optimal focal plane are deemphasized, and wherein image objects located on the second optimal focal plane are presented in-focus and image objects below the second optimal focal plane are deemphasized.

2. The system of claim 1, wherein one or more of the images in the plurality of images are color images and the computer apparatus converts the one or more color images in the plurality of images to greyscale prior to identifying the optimal focal plane for the plurality of images.

3. The system of claim 1, wherein the composite image includes a honeycomb structure of the biological sample.

4. The system of claim 3, wherein the honeycomb structure is substantially in focus.

5. The system of claim 1, further comprising a microscope and a camera.

6. The system of claim 5, further comprising a microscope stage.

7. The system of claim 1, wherein the cell objects of interest are cell structures.

8. The system of claim 1, wherein the cell objects of interest are cell nuclei.

9. The system of claim 1, wherein the cell objects of interest are cytoplasmic mucus pockets in goblet cells.

* * * * *